3,173,214
INSTRUMENT FOR LAYING-OUT TOOLS AND THE LIKE
John G. Daller, 190 Marcroft St., Stratford, Conn.
Filed Oct. 15, 1963, Ser. No. 316,336
6 Claims. (Cl. 33—189)

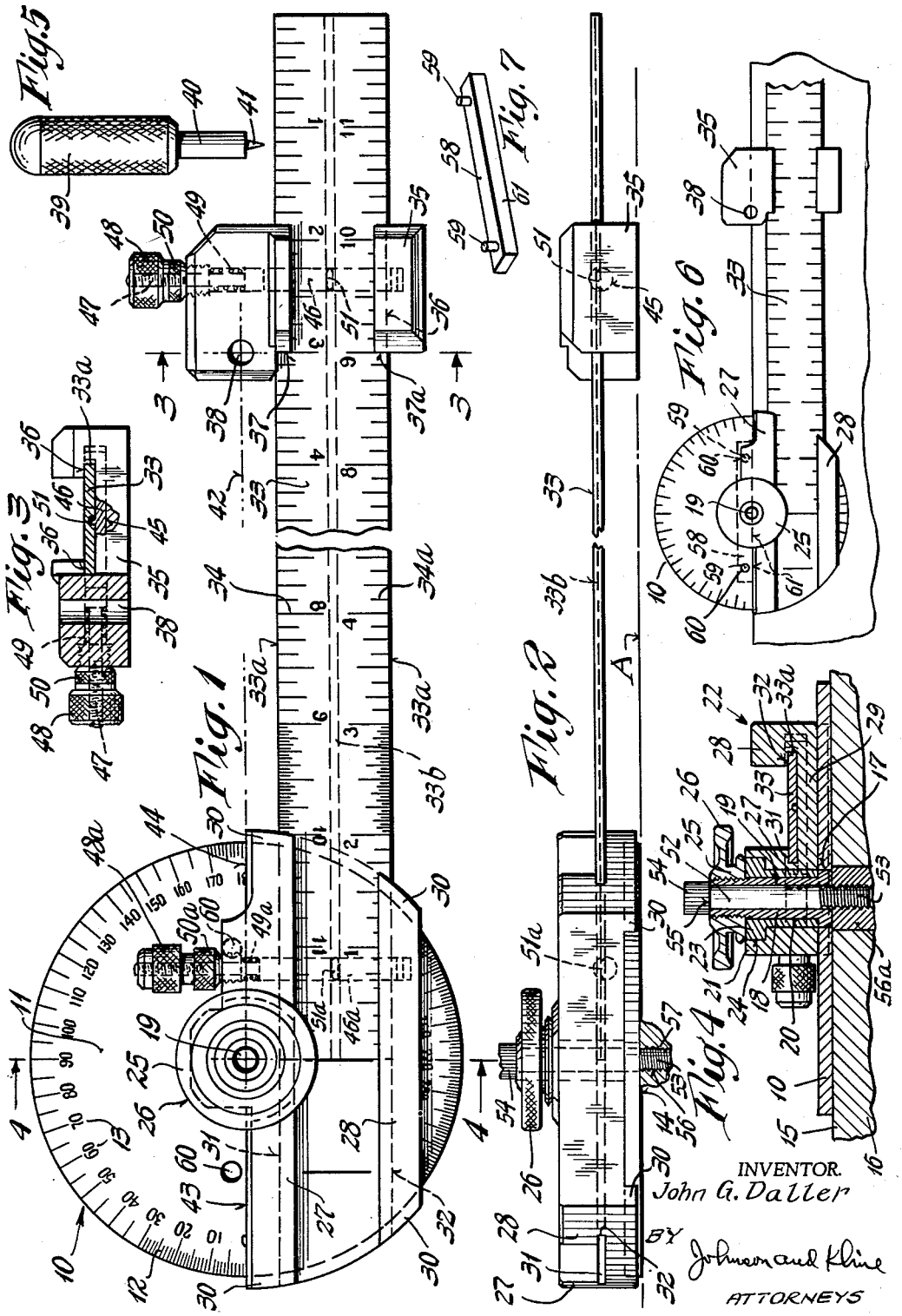

This invention relates to an instrument particuarly designed for convenient use by toolmakers and other mechanics in laying-out work to be performed on dies, punches, templates and the like, as well as on cams, gears and other mechanical elements. It also has utility in checking layouts made of work to be performed and the work which has been performed on workpieces.

An object of this invention is to provide an instrument which is particularly useful and convenient in laying-out work on radial and arcuate lines from a predetermined reference point on a workpiece, and preferably includes means for holding and guiding a marking device, such as a prick punch and/or scriber, whereby work-lines may be delineated or points marked with ease and accuracy. According to the present invention in its preferred form, the instrument is provided with graduated markings to designate linear and arcuate measurements.

A feature of the present invention is the provision of means whereby the instrument may be attached to the workpiece in fixed relation to a predetermined reference point on the workpiece, thereby avoiding the necessity of the mechanic holding the instrument in place while making adjustments of the instrument and markings on the workpiece.

Another feature is the provision of means whereby the instrument may be used to locate a reference point with relation to a reference edge of a workpiece and to delineate lines on the workpiece parallel with, perpendicular to, or at an angle with reference to the edge of the workpiece, or mark-off points on such lines.

In brief, the instrument of the present invention, in the form illustrated herein, comprises an orientation member having an arcuate, preferably circular, scale graduated in degrees of a circle arranged to be placed and held concentric with a reference point on the workpiece for adjustable arcuate movement, a straightedge carrier mounted on the orientation member and swingable concentric with the reference point and the arcuate scale, a straightedge mounted on the carrier offset from but parallel to the diameter of the arcuate scale, a slide block on the straightedge having a socket for holding the marking device, the axis of the socket being located on an extension of the diameter of the arcuate scale. Means are provided for releasably holding the orientation member and the slide block in position to which they may be adjusted.

Other features and advantages will hereinafter appear.

In the accompanying drawings—

FIGURE 1 is a plan view of the instrument of the present invention with the central portion of the straightedge broken away.

FIG. 2 is a side elevation of the instrument as shown in FIG. 1.

FIG. 3 is a sectional view of the slide block taken on the line 3—3 of FIG. 1.

FIG. 4 is a sectional view taken on the line 4—4 of FIG. 1 and showing the instrument as secured to a workpiece for adjustable movements about the reference point on the latter.

FIG. 5 is a front view of a marking device which may be employed either as a prick punch or scriber.

FIG. 6 is a plan view of the instrument showing the means whereby the instrument may be used like a T-square to delineate lines or mark-off points on the workpiece in relation to a reference edge thereof.

FIG. 7 is a perspective view of an auxiliary straightedge.

As shown in the accompanying drawings, the instrument of the present invention comprises an orientation member which, as shown, is preferably in the form of a circular metal disk 10 having along its peripheral edge on its upper surface 11 a scale 12 graduated in degrees of a circle and numerical designations 13 associated therewith. The lower surface 14 of the disk 10 is flat and is adapted to be rested on the flat working surface of a workpiece 15, such as a die block 16, template or the like or a cam blank or gear blank, etc. on which the machining or other work which is to be performed is laid out by the use of the instrument and a suitable scribing or prick punch device.

There is in the center of the disk 10 a hole 17 in which is rigidly secured a stud 18 which has a longitudinal bore 19 concentric with the disk 10. As will be explained below, the bore 19 serves to locate the disk with relation to a reference point on the workpiece 15.

Slidably mounted on the stud 18 is a sleeve 20 which forms a bearing for a hub 21 of a straightedge carrier 22 whereby the latter may rotate about the axis of the stud 18. The upper end of the sleeve 20 has a flange 23 located in a recess 24 in the upper end of the hub 21. The upper end of the stud 18 is threaded and receives a threaded clamping member 25 which bears against the top of the flange 23. The clamping member 25 has a suitable fingerpiece 26 whereby it may be rotated to cause the sleeve 20 to force the hub 21 of the straightedge carrier against the disk 10 and hold it in the position to which the straightedge carrier is adjusted.

The straightedge carrier 22 preferably has spaced parallel guide blocks 27 and 28 connected together and to the hub 21 by a body portion 29 (preferably integrally) which may be extended as shown beyond the peripheral edge of the disk 10 and these have flange portions 30 slidably engaging the peripheral edge of the disk 10.

The guide blocks 27 and 28 have on their facing edges grooves 31 and 32 forming ways slidably receiving and holding the longitudinal edges 33a of a straightedge 33 which is provided with a scale having designated linear graduations 34 and 34a.

Mounted to slide on the straightedge 33 is a slide block 35 which, as shown in FIG. 3, is provided with parallel grooves 36 for engaging the longitudinal edges of the straightedge 33. Knife-edges 37 and 37a on the slide block 35 overlie designated graduations 34 and 34a respectively on the straightedge. The slide block has a hole forming a socket 38 for a marking device 39 (FIG. 5) such as a prick punch and/or scriber having a shank 40 fitting the socket 38 without looseness and preferably held substantially perpendicular to the plane of the workpiece. A marking point 41 on the device is concentric with the shank 40 and the socket 38.

The grooves 36 of the slide block 35 are so positioned that when the disk and slide block are resting on the flat surface of the workpiece, the straightedge lies in a plane spaced from but substantially parallel with the plane of the surface A of the workpiece.

According to the present invention, the grooves 31 and 32 in the blocks 27 and 28 of the straightedge carrier 22 are located on chords parallel to but spaced from the diameter of the disk 10, while the axis of the socket 38 in the slide block 35 is located on a line indicated by the broken line 42 in FIG. 1 forming an extension of the diameter of the disk 10 which is indicated by knife-edges 43 and 44 on the adjacent guide blocks. This is an advantageous feature of the present invention over the usual arrangement in which radial lines would be inscribed by drawing a scriber along the edge of the straightedge because, according to the present invention, the line would be clearly visible to the mechanic, since it would be spaced from the edge of the straightedge.

In order to hold the slide block 35 on the straightedge in adjusted position against casual movement, which would be desirable in inscribing arcs of determinate radii, the slide block has a transverse channel 45 carrying a clamping bar 46, the upper end of which has a threaded rod 47 engaged by a thumb knob 48. A spring 49 between the bar 46 and a bushing 50 normally frees a clamping lug 51 on the clamping bar 46 from the side of a groove 33b on the straightedge. However, when the thumb knob 48 is rotated, say to the right, the bar 46 is pulled against the tension of the spring 49 to cause the lug 51 to engage the side of the groove 33b and clamp the slide block against movement relative to the straightedge.

To provide for a situation in which there may be obstructions on the workpiece which would interfere with the free swinging movement of the straightedge 33 about the disk 10 and reference point, the straightedge is adjustably mounted on the carrier 22, the grooves 31 and 32 extend for the full length of the guide blocks 27 and 28 thereby permitting the outer end of the straightedge to be moved closer to or farther from the axis of the carrier 22 when desired or when convenient or necessary. It will be understood that since the grooves 31 and 32 are open at the left-hand sides of the blocks as viewed in FIG. 1, the adjacent end of the scale may be moved through the grooves and beyond the carrier if necessary.

The straightedge 33 may be releasably secured in adjusted position on the carrier by suitable clamping means, such, for instance, as that employed to clamp the slide block on the straightedge as shown in FIGS. 3 and 4 and described above and corresponding parts for the same reference numerals as in FIGS. 3 and 4 with the exponent a applied thereto.

As pointed out above, the instrument in the broader aspects of the present invention may be held on the workpiece in any suitable manner, for instance by hand in which case the instrument may be located by observing the reference point on the work and the center thereof through the bore 19 of the stud 18. If the reference point is marked by a center punch, a device such as the prick punch shown in FIG. 5 may be used to locate the disk 10 relative to the center punch.

However, the present invention provides positive means for holding the disk 10 in adjusted position on the workpiece which is available for use when the nature of the workpiece permits. This feature of the invention is illustrated in detail in FIG. 4 and comprises a rod 52 snugly fitting the bore 19 of the stud 18 and having at its lower end screw threads 53 and at its upper end a threaded knob 54 having a shoulder 55 adapted to engage the upper end of the stud 18 to apply downward pressure to the latter and, of course, to the disk 10 which carries it. In the use of the rod 52, the reference point is located by a center punch on the workpiece which is then drilled to provide a hole 56 which is tapped to provide screw threads 57 corresponding to the screw threads 53 on the rod 52.

When the disk is centered over the reference point, the rod 52 is inserted in the bore 19 and into the threaded hole 56. The disk 10 is then rotated if necessary to register the desired degree mark with the knife-edges 43 and 44 and then the rod 52 is turned until the shoulder 55 thereon engages the stud 18 and clamps the disk to the workpiece in oriented position. If it is desired to shift the disk 10, it is merely necessary to loosen the rod 52 and readjust the disk 10 to the desired position.

Once the rod 52 is tightened, the carrier may be swung on the axis of the rod 52 to adjusted position without fear of the disk being moved off-center with relation to the reference point.

If the reference point on the work would be located in a hole in the workpiece, as in a bearing in a wheel etc., a threaded bushing 56a shown in FIG. 4 may be inserted in the hole before the reference point is marked, drilled and tapped.

In order to lay out straight lines with relation to a reference edge on the workpiece, be they parallel with, perpendicular to or at an angle with relation thereto, the present inveniton provides a straight bar 58 (FIG. 6) which is provided with a pair of mounting pins 59, and provides in the disk 10 a pair of holes 60 to receive and snugly fit the pins. The working edge 61 of the bar 58, the pins 59 and the holes 60 is so relatively positioned that when the bar 58 is mounted on the underside of the disk 10, its edge 61 will be coincident with the diameter of the disk.

Thus the instrument may be used in the manner of a T-square in locating reference points from one or more edges of the workpiece, but with the advantage of having the marking device mounted in the socket 38 of the slide block 35 in accurate alignment with the knife-edges 37 and 37a and the axis of the straightedge carrier.

While the instrument of the present invention has many uses in laying-out work to be machined, it is particularly useful and convenient in laying-out arcuately spaced points on concentric arcs or circles. To do so, assuming the disk 10 is clamped to the work concentric with the reference point, an arc having a 9" radius may be drawn on the work by adjusting the slide block 35 until the knife-edge 37a coincides with the "9" indication on the scale, locking it in position by operating the knob 48, placing the scriber (FIG. 5) in the socket, loosening the clamping nut 25 and swinging the straightedge and its carrier on the axis of the stud 18, applying sufficient finger pressure if necessary to draw the arc on the work. The length of the arc can be determined by observing the movement of the knife-edge on the bar 27 of the carrier relative to the degree scale on the disk. To draw a concentric arc having a radius of 8" for instance, it is merely necessary to adjust the slide block 35 along the straightedge to the "8" position and proceed as before.

Thus, in laying-out programming cams the height of the lobes may be indicated by adjusting the slide block 35 along the straightedge and the arcuate lengths of the lobes and dwells by adjusting the straightedge and its carrier relative to the degree scale on the disk. In this latter step, the disk 10 may be left clamped to the work and the number of degrees that the points are to be arcuately spaced can be laid-out by progressive and cumulative reading of the degree scale. However, this is not necessary with the instrument of this invention because, after a point on an arc is located and marked, the straightedge and slide block can be held stationary while the disk is unclamped and adjusted to bring the "0" indication under the knife-edge 44, reclamp the disk, and then swing the straightedge and carrier through the desired number of degrees. This can be done without difficulty or inaccuracy because the disk and the carrier are maintained concentric with the reference point by the stud 18.

Variations and modifications may be made within the scope of the claims and portions of the improvements may be used without others.

I claim:

1. An instrument of the character described comprising an orientation disk having a flat surface to engage and rest upon a flat surface of a workpiece, the other surface of the disk having on its peripheral margin an arcuate scale provided with degree-indicating marks; a straightedge having a scale marked off in linear dimensions; a straightedge carrier mounted on the orientation member for rotation about the center of said arcuate scale, said orientation member and the straightedge carrier having apertures whose axes are aligned and coincident with the axis of the arcuate scale through which a reference point on the workpiece may be located, said carrier having means for engaging and supporting the straightedge so that at least one of its longitudinal edges lies on a chord of the arcuate scale parallel to but offset from a diameter of the arcuate scale, said carrier also having indicating means located substantially on said diameter of said arcuate scale and cooperating with the latter and the degree-indicating marks thereon to measure angular movements and positions of the carrier and straightedge; a slide mounted on said straightedge for movement parallel with the straightedge toward and from the orientation member, the slide having a socket whose axis is located on an extension of a radial line on which said indicating means is located for receiving and holding a scriber or prick punch; and indicator means on the slide in alignment with the axis of said socket and cooperating with said scale on the straightedge to measure distances from the center of the socket to the center of the arcuate scale.

2. An instrument of the character described as defined in claim 1, in which there are manually operable clamping means for releasably holding the orientation disk and straightedge carrier in any adjusted position against casual relative movement without interfering with the location of said reference point through said apertures.

3. An instrument of the character described as defined in claim 1, in which there are manually operable clamping means for releasably holding the straightedge and carrier together in adjusted position against casual relative movement, and in which there are manually operable clamping means for releasably holding the orientation disk and straightedge carrier in any adjusted position against casual relative movement without interfering with the location of said reference point through said apertures.

4. An instrument of the character described as defined in claim 1, in which there are manually operable clamping means for releasably holding the orientation disk and straightedge carrier in any adjusted position against casual relative movement without interfering with the location of said reference point through said apertures, and in which there are manually operable means for releasably holding the straightedge and slide together in adjusted position against casual relative movement.

5. An instrument of the character described as defined in claim 1, in which there are manually operable clamping means for releasably holding the orientation disk and straightedge carrier in any adjusted position against casual relative movement without interfering with the location of said reference point through said apertures, and in which there are manually operable means for releasably holding the straightedge and slide together in adjusted position against casual relative movement, and in which there are means for mounting the straightedge on the carrier for longitudinal movement parallel with said chord of the arcuate scale, and in which there are manually operable clamping means for releasably holding the straightedge and carrier together in adjusted position against casual relative movement.

6. An instrument of the character described as defined in claim 1, further including a bar, and means on the orientation member for removably receiving and holding said bar on its underside in position to have one of the longitudinal edges of said bar in vertical alignment with a diameter of the arcuate scale for engagement with a true edge of the workpiece whereby lines may be inscribed on the surface of the workpiece which are parallel with or perpendicular or oblique to said true edge of the workpiece and radially in angular relation to each other with the intersecting lines coincident with the center of the arcuate scale of the orientation member.

References Cited in the file of this patent

UNITED STATES PATENTS

| | | |
|---|---|---|
| 909,686 | Schellenbach | Jan. 12, 1909 |
| 1,483,935 | Golden | Feb. 19, 1924 |
| 2,399,579 | Smith | Apr. 30, 1946 |
| 2,777,204 | Graves | Jan. 15, 1957 |

FOREIGN PATENTS

| | | |
|---|---|---|
| 135,350 | Sweden | Apr. 22, 1952 |
| 546,190 | Great Britain | July 1, 1942 |
| 880,472 | Great Britain | Oct. 25, 1961 |